United States Patent [19]
Hawkins

[11] 3,899,629
[45] Aug. 12, 1975

[54] PRESHAPED WIRE ROD AND SPACER HAVING INCREASED LEVERAGE AND GRIPPING FORCE

[75] Inventor: Ronald G. Hawkins, Massena, N.Y.

[73] Assignee: Aluminum Company of America, Pittsburgh, Pa.

[22] Filed: May 22, 1974

[21] Appl. No.: 472,138

[52] U.S. Cl............. 174/40 R; 24/131 C; 174/146; 174/DIG. 12
[51] Int. Cl.²......................................... H02G 7/12
[58] Field of Search........ 174/40 R, 42, 129 R, 135, 174/136, 146, 173, DIG. 12; 24/131 C, 132 CS

[56] References Cited
UNITED STATES PATENTS
1,725,610  8/1929  Byl.............................. 174/DIG. 12
2,959,632  11/1960  Peterson..................... 174/DIG. 12

FOREIGN PATENTS OR APPLICATIONS
357,400   9/1931  United Kingdom................. 174/42
41-20357  3/1966  Japan................................. 174/173
42-6906   3/1967  Japan............................ 174/DIG. 12
187,358   1/1964  Sweden........................ 174/DIG. 12

*Primary Examiner*—Laramie E. Askin
*Attorney, Agent, or Firm*—Elroy Strickland

[57] ABSTRACT

A wire or rod-like device having preshaped helices or curved elements for application to an overhead conductor lengthwise of the conductor, the helices or curved elements of the device increasing in pitch in the direction in which the element is applied to the conductor.

4 Claims, 8 Drawing Figures

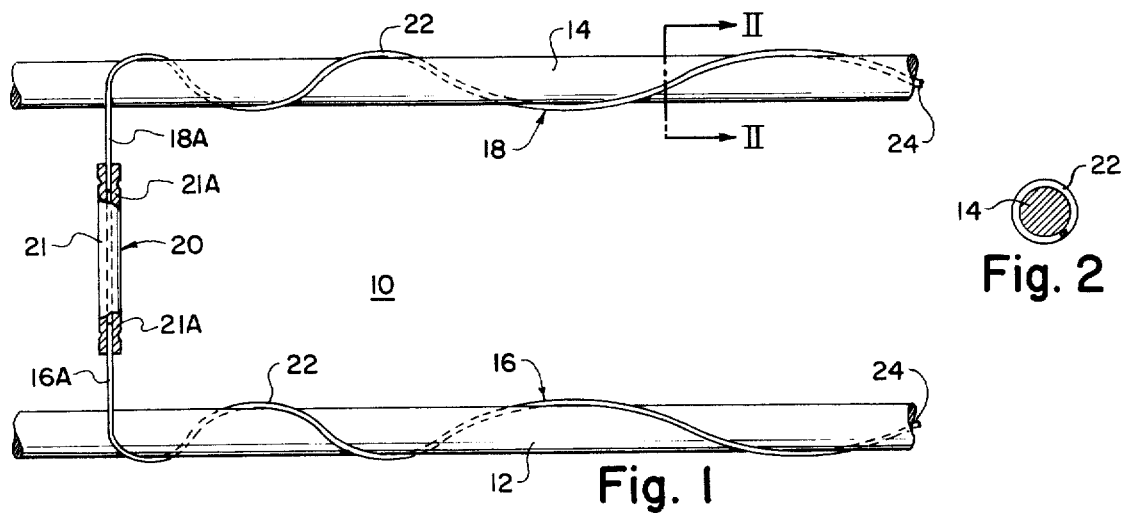
Fig. 1
Fig. 2
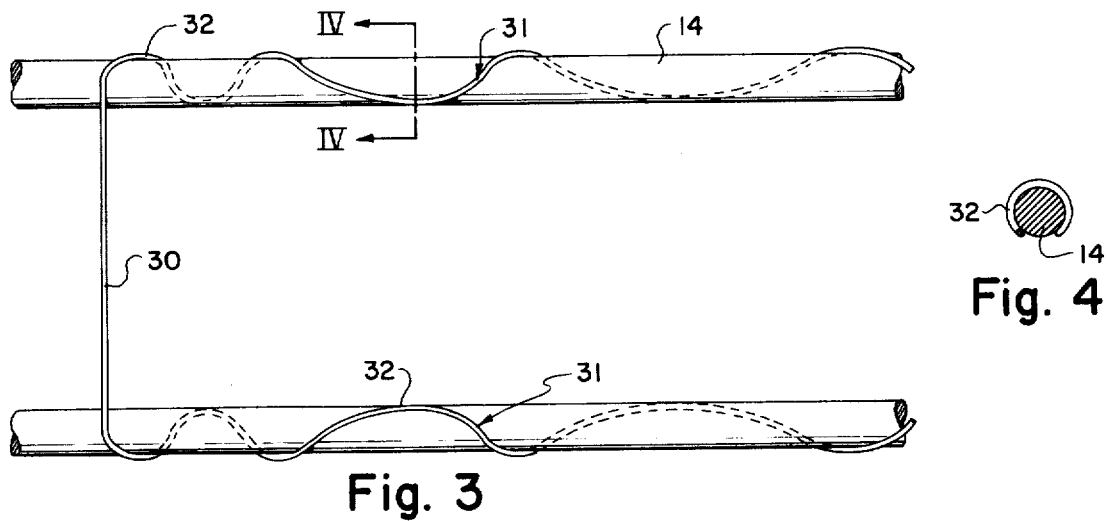
Fig. 3
Fig. 4
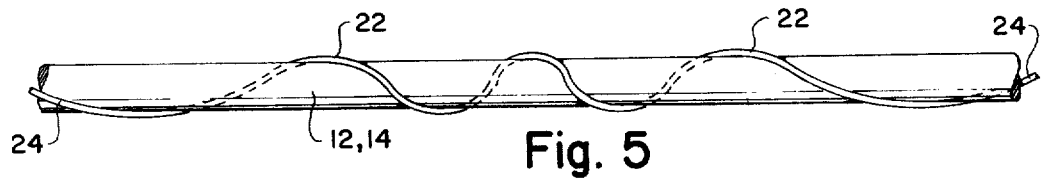
Fig. 5

3,899,629

PRESHAPED WIRE ROD AND SPACER HAVING INCREASED LEVERAGE AND GRIPPING FORCE

BACKGROUND OF THE INVENTION

The present invention relates generally to preshaped or factory wound, helical armor rod and spacing devices for overhead electrical lines, and particularly to a resilient wire or rod provided with fabricated helices having a changing pitch or centerline distances between adjacent helices.

Heretofore, preshaped helical wire and rod devices for application to overhead line conductors have employed helical turns that have been essentially constant in pitch and have required a substantial manual effort to effect their installation or conductors, particularly as the free end of the rod is approached in the process of wrapping it around a conductor. As the workman approaches the end of the wrapping operation, there is a decreasing, minimum lever with which to provide an adequate mechanical advantage and facility for effective manipulation of the rod, and, coupled with the fact that the rod is quite stiff, the rod tends to catch the fingers of the workman installing the rod between the rod and conductor, when working with a "cold" line, when the last turn or turns of the rod are applied.

When working with an energized or "hot" line, the workman must use special insulated tools to install a preshaped helical wire or rod, the use of such tools being somewhat cumbersome especially when the rod is stiff and difficult to manipulate.

To overcome this problem, the ends of one prior, preshaped helical device were extended outwardly from the axis of the helical turns so that the ends could be easily gripped and manipulated by a workman for the installation process. However, the outwardly extending ends form projections on the overhead conductor which tend to produce corona discharge at high voltage levels.

BRIEF SUMMARY OF THE INVENTION

The present invention provides a helically preshaped or prefashioned wire or rod with a mechanical advantage and facility for installing on a conductor without the use of outwardly extending end projections, and, in addition, provides an increase in the force or slip load with which the preshaped wire or rod grips the conductor over that of conventional armor wire and rods. In addition, the wire or rod of the invention is economical in that it requires a minimum of rod material, and since the wire or rod does not have outwardly extending projections, it has good corona characteristics, as explained in detail hereinafter.

More particularly, the present invention comprises a preshaped, helical wire or rod in which the helices have a variable or non-uniform pitch or centerline distance between adjacent helices such that the pitches or centerline distances increase in the direction of the end of the wire or rod that is last applied to a conductor. Such a variable pitch helix provides a wire or rod that is easier to bend and thus easier to apply. Because of this bending ease, the workman has more effective control of the end portion of the rod such that his fingers are not as prone to be caught between the rod and conductor when the end of the rod is disposed in place on the conductor, as is the case with rods having conventional, uniform pitch helices. If the workman uses a tool to install the rod, the easier bent wire or rod of the invention is also easier to install with a tool.

THE DRAWINGS

The invention, along with its objectives and advantages, will be better understood by consideration of the following detailed description in conjunction with the accompanying drawings in which:

FIG. 1 shows a conductor spacer device constructed in accordance with the principles of the present invention;

FIG. 2 is a sectional view of a conductor in FIG. 1 taken along lines II—II in FIG. 1;

FIG. 3 is an alternative embodiment of the invention;

FIG. 4 is a sectional view of a conductor in FIG. 2 taken along line IV—IV in the figure;

FIG. 5 is an embodiment of the invention having use as an armor rod or clamping device;

PREFERRED EMBODIMENTS

Figure 6:
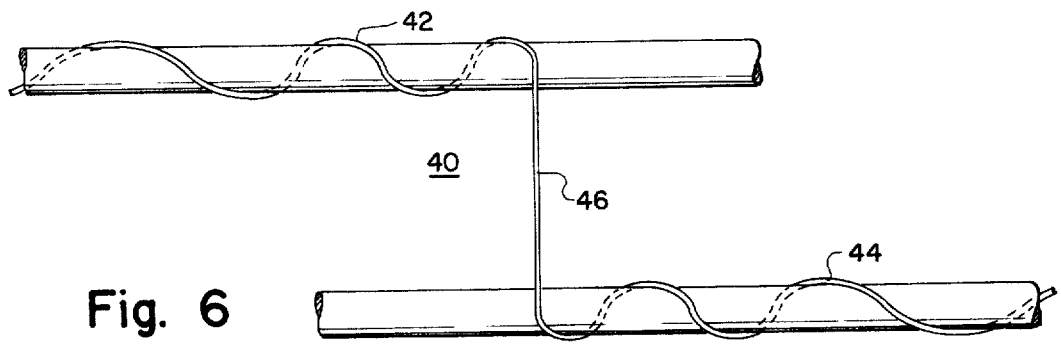
FIG. 6 is yet another spacing device embodiment of the invention.

Referring now to the drawings, FIG. 1 shows a device 10 for spacing two parallel conductors 12 and 14, such as two subconductors of a two conductor bundle, the device 10 comprising a wire or rod element prefashioned or fabricated to have two conductor gripping portions 16 and 18 joined together at one end of each conductor gripping portion by a spacer portion 20. Each conductor gripping portion comprises resilient, preshaped helical turns 22 shown in FIG. 1, having a pitch or centerline distance increase substantially greater than the increase between the two previous turns, though the invention is not limited to such an increase or to the number of turns shown in FIG. 1. The rate or amount of increase in pitch depends upon such parameters as rod diameter and alloy, and the diameter of the conductor on which the wire or rod is to be installed, these parameters affecting also the resilience and stiffness of the wire or rod. In any case, the increase in pitch provides a free, elongated end 24 for each of the conductor gripping portions 16 and 18.

The spacer portion 20 may be a straight, integral wire portion of the preshaped helices extending the full distance between the helices and conductors, and located at a right angle to the axes of the helices and conductors, or, the spacer may comprise a tube or rod 21, as shown in FIG. 1, extending between relatively short, right angle projections 16A and 18A of the helices, the projections extending into the opposed ends of the tube or rod, as shown in the broken away portions of the tube or rod. The projections and the tube or rod may be mechanically secured together by compressing the tube or rod on the projections, as indicated at 21A in FIG. 1.

To install such a rod or spacer device 10, the helix having the smallest pitch is first applied to the line or conductor by grasping the rod by hand or with a tool and moving the rod around the conductor. As the rod is moved around the conductor, the helices are wrapped on the conductor, the free, elongated end 24 of the rod providing ample leverage and mechanical advantage for rod manipulation. In this manner, if the workman handles the rod element 10 directly with his hands, he can place the free end of the element on the conductor 12 or 14 with a facility and a reduction in manual effort not afforded by the conventional, constant pitch helical rod such that the chances of catching of his fingers between the element and the conductor are greatly reduced.

In order to determine the force with which the rod element of the invention, as thus far described, grips a conductor, as well as the force or effort required to install the element, comparative tests were made by installing a conventional, uniform pitch rod element and the rod element of the invention, with each of the elements having three helices, on a fixed, horizontally disposed conductor, and measuring the force required to place each of the helices of each element on the conductor. When all of the turns of each element were in place, each element was pulled in an axial direction to determine the force at which the turns, in total, gripped the conductor. The installing forces were measured by a compression spring scale mechanically connected to the free end of the conventional element, and to the free, elongated end of the element of the subject invention, and the same end then gripped by hand to sequentially dispose each of the helices of each element on the conductor.

In applying only the first helix did the uniform pitch element require less force (0.5 lbs.) than the nonuniform pitch element (1.5 lbs.) of the invention. With the second and third helices of the two rod elements, that of the subject invention required substantially less force to install than the uniform pitch element, the figures being 1.0 lbs. and 1.7 lbs. to 1.8 lbs. and 2.8 lbs. respectively.

In measuring the force or slip load with which the helices of the two rod elements gripped the fixed conductor, the helices were sequentially placed on the conductor and sequentially pulled in the axial direction of the conductor against the force of a second compression spring scale. With one turn of the helix in place, the force required to slip the rod element of the present invention was 4.1 lbs. For one turn of a conventional rod element, the force required to slip the turn on a conductor was 0.75 lbs. With the first and second turns in place the comparative results were 5.2 lbs. and 2.5 lbs. respectively for the rod element of the invention and that of the conventional design. With all three turns in place the results were 5.8 lbs. for the element of the invention and 4.1 lbs. for that of the conventional element.

From the above test results on slip load it is readily seen that the rod element of the present invention has a gripping force substantially greater than that of the conventional element, the one helical turn of the element of the subject invention having a slip load (4.1 lbs.) identical to that of the conventional element with all three helical turns in place.

Other advantageous results simultaneously obtained with the conductor gripping elements 16 and 18 of the invention are rod material economy and the good corona results, as mentioned earlier. As seen from FIG. 1 of the drawing, no rod material is used that does not directly and tightly engage the conductors 12 and 14, excepting of course the spacer portion 20, and the increasing pitch of the gripping portions closely hug conductors 12 and 14 so that no protrusions exist to afford areas for substantial corona discharge. This is true for the ends 24 of the gripping elements such that these elements are an improvement over those armor rods having free end portions extending outwardly and away from the conductor, as described earlier, such outwardly extending portions providing ample opportunity for corona discharge.

FIG. 3 of the drawings shows an embodiment of the invention in which two, parallel conductor gripping portions 31 of a prefabricated wire or rod spacer 30 comprise longitudinally spaced apart, preshaped, curved elements 32 alternatively located to grip conductors 12 and 14 from opposed sides thereof, as best seen in the view of FIG. 4. Like the helices of the embodiment of FIGS. 1 and 2, the opposed, curved elements 32 have a constant inner diameter that is prefabricated to correspond closely to that of the conductors to tightly engage the same when applied thereto, and varying, increasing pitch, or centerline distances between adjacent curved portions in the direction away from a spacer portion 30 that greatly facilitates the application of the gripping portions to a conductor. As shown in FIG. 4, it is not necessary that the opposed elements extend completely around the conductor.

In addition, the parallel conductor gripping portions 31 can extend from the spacer portion 30 in opposed directions rather than in the same direction, as depicted in FIG. 3.

In applying the conductor gripping portions 31 to a conductor, the opposed elements 32 thereof having the smallest pitches are first snapped onto the conductor by forcing the elements against the conductor, the conductor being thereby employed to spread the opposed elements apart. The remaining opposed elements 32 are then snapped into place on the conductor by simply grasping the free end of the portion 31 and weaving it back and forth to sequentially engage and thereby sequentially force each gripping element into gripping disposition with the conductor.

To remove such a gripping portion 31 from a conductor, the end thereof remote from the spacer portion 30 is simply grasped and pulled away from the conductor, the elements being sequentially spread apart as the conductor passes out of the grasp of the opposed elements 32, the first of elements to leave the conductor being that with the largest pitch.

FIG. 5 of the drawings shows an embodiment in which preshaped helical portions 22 of a wire or rod having the increasing pitch characteristic of the invention may be used as armor rod for the protection and reinforcement of overhead conductors, and as a device for securing a conductor to an insulating support, for example. As shown, the helices increase in pitch in two, opposed directions from a center location along the wire or rod.

FIG. 6 of the drawings shows a conductor spacing embodiment 40 of the invention in which preshaped helical conductor engaging portions 42 and 44 of the embodiment extend in opposed, parallel directions from a conductor spacer portion 46 of the embodiment, the spacer portion, as shown in FIG. 6, is formed integrally with the helical portions 42 and 44, though the separate spacing tube or rod 21 of FIG. 1 could be employed in place of integral portion 46. The helices of 42 and 44, as shown in FIG. 6, have a pitch or centerline distance between them that increases in the direction away from the spacer portion 46, and are otherwise formed in the manner of the helices of FIGS. 1 and 2. Hence helices 42 and 44 are applied to conductors in the manner and have all the advantages of the embodiment of FIGS. 1 and 2, as described earlier.

Figure 7:
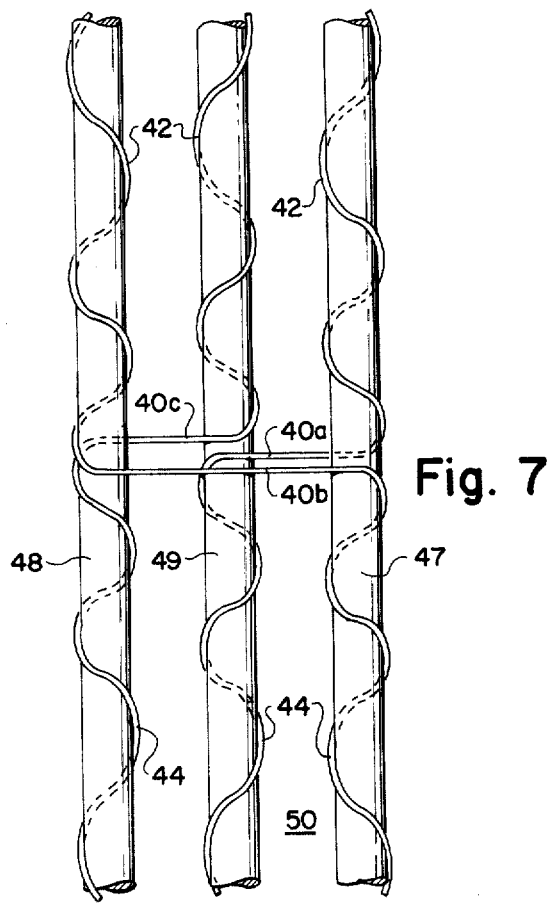
FIG. 7 is a plan view of a three conductor bundle spaced by three of the devices of FIG. 6.
Figure 8:
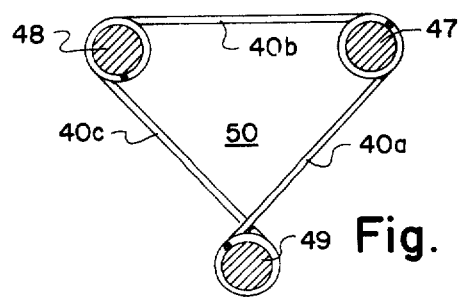
FIG. 8 is an end elevational view of the spaced conductor bundle depicted in FIG. 7.

The spacer of FIG. 6, however, has the additional advantage in that it can be employed in a three conductor bundle arrangement 50, as shown in FIGS. 7 and 8 of the drawings, i.e., three such spacer elements, labeled 40a, 40b and 40c in FIGS. 7 and 8, can be employed to space three subconductors 47, 48 and 49 of the bundle without overlap or nesting of the preshaped portions 42 and 44. In this manner, the spacer of FIG. 6 is more versatile than the embodiments shown in FIGS. 1 to 4 in which the conductor gripping portions thereof extend in the same direction.

While this invention has been described in terms of preferred embodiments, the claims appended hereto are intended to encompass all embodiments which fall within the spirit of the invention.

Having thus described my invention and certain embodiments thereof, I claim:

1. A device for spacing parallel conductors when applied thereto comprising a wire or rod-like element having two, parallel portions preshaped with helices to conform to said conductors when applied thereto, and a spacer portion located intermediate said portions for extending between the conductors, the helices of the parallel portions having pitches between adjacent helices that increase in the direction away from the spacer portion, and a constant internal diameter corresponding to the external diameter of the conductors to tightly grip the same when applied thereto, the increase in pitch between adjacent helices providing an elongated element portion that is effective to minimize the force required to respectively apply the parallel portions to the conductors, the smallest pitch helix having a maximum gripping force, with a minimum use of element material.

2. The spacing device of claim 1 in which the parallel helical portions thereof extend in the same direction from the spacer portion.

3. The device of claim 1 in which the parallel helical portions extend in opposite directions from the spacer portion.

4. The device of claim 1 in which the spacer and parallel portions are integrally formed.

* * * * *